United States Patent Office 3,453,368
Patented July 1, 1969

3,453,368
SMALLER HIGH POTENCY COMPRESSED TABLETS OF ASCORBIC ACID
Louis Magid, Clifton, N.J., assignor to Hoffmann-La Roche Inc., Nutley, N.J., a corporation of New Jersey
No Drawing. Filed Jan. 13, 1966, Ser. No. 520,358
Int. Cl. A61k *15/00, 9/00*
U.S. Cl. 424—280                        4 Claims

ABSTRACT OF THE DISCLOSURE

A composition capable of being compressed, after granulation, into tablets relatively small in size and light in weight and which contain high levels of ascorbic acid is formed from (a) unground ascorbic acid crystals, 18% to 40% by weight of which are retained on a 200 mesh screen and 60% to 82% by weight of which pass through a 200 mesh screen, (b) a modified starch, a dextrin, a pregelatinized starch or a mixture thereof.

---

This invention relates, in general, to ascorbic acid-containing compositions and to a process for producing and using same. More particularly, the invention relates to granulations which are useful in the production of high potency ascorbic acid tablets; to a process for preparing such compositions; and to the tablets produced therefrom.

Tablets which contain ascorbic acid as the active ingredient, as well as processes for producing such tablets, are well known in the prior art. Ascorbic acid, although crystalline or powdery in nature, cannot be compressed into tablets without the aid of certain adjuvants and excipients. The quantity of adjuvants and excipients required in any particular instance will vary, depending upon the identity of the materials selected for use. Quite often, however, the adjuvants and excipients will comprise a major portion, for example 50% to 80%, of the weight of the tablets. Such large quantities of excipients and adjuvants are needed to enhance the compressibility characteristics of the granulations and the stability, hardness and disintegration characteristics of the tablets. While the necessity of using large quantities of excipients and adjuvants does not pose a problem which is particularly critical in the case of low potency ascorbic acid tablets, the problem is acute in the case of high potency ascorbic acid tablets. Since, on a per tablet basis large quantities of adjuvants and excipients are required to obtain tablets having completely satisfactory physical characteristics and since high potency tablets require the use of large quantities of ascorbic acid, the tablets must, of necessity, be rather large. For obvious reasons, the consumer's acceptance of such tablets can be seriously affected. The present invention seeks to obviate this objection by providing compositions which are compressible into high potency ascorbic acid tablets, having outstanding physical characteristics and properties, which are relatively small in size and light in weight.

Thus, in its most comprehensive embodiment, the invention is concerned with novel compositions which contain ascorbic acid as the active ingredient.

In a more specific embodiment, the invention is concerned with ascorbic acid-containing compositions which are readily compressible into tablets.

In other embodiments, the invention is concerned with a process for producing the aforesaid ascorbic acid-containing compositions and with the small size, light weight, high potency ascorbic acid tablets which are produced from such compositions.

It has been found that when a mixture containing (1) ascorbic acid, of the type described hereinafter and (2) a modified starch, a dextrin, a pregelatinized starch or a mixture thereof is granulated and subsequently admixed with a lubricant of the type conventionally used in pharmaceutical tabletting operations, a composition is obtained which is capable of being compressed directly into tablets, relatively small in size and light in weight, which have outstanding physical characteristics and which contain high levels of ascorbic acid.

Ascorbic acid is commercially available in the form of unground crystals or powders. The ascorbic acid which is used in the practice of the present invention is in the form of unground crystals. The crystals comprising any particular batch will, obviously, vary in particle size. In general, however, the objectives of this invention will be achieved by the use of ascorbic acid made up of unground crystals, 18% to 40% by weight of which are retained on a 200 mesh screen and 60% to 82% by weight of which pass through a 200 mesh screen. The ascorbic acid which is used in the preferred practice of the invention is in the form of unground crystals about 21% by weight of which are retained on a 200 mesh screen and about 79% by weight of which pass through a 200 mesh screen. As used herein, the expression "200 mesh screen" denotes a screen having 200 openings per linear inch.

In general, any modified starch, dextrin or pregelatinized starch which is at least partially soluble in water can be employed in preparing the compositions of this invention. Such materials, which for convenience of expression will be referred to herein collectively simply as binders, are commercially available from a variety of sources and under various trade names. Thus, for example, there can be used in the practice of this invention the pregelatinized, modified and stabilized waxy maize starch which is marketed by the National Starch and Chemical Corporation under the trade name "Instant Clearjel." Furthermore, there can be employed the pregelatinized corn starch marketed by the Hubinger Company under the trade name "OK Pre-Gel." Other binders, suitable for use, are as follows: the pregelatinized food starch, refined from tapioca, marketed under the trade name "Instant Gel"; the stable modified amylopectin, marketed under the trade name "Kosol"; the low viscosity tapioca dextrin marketed under the trade name "Crystal Gum"; the dextrinized corn starch marketed under the trade name "Purity Glaze"; and the cold water gelling pregelatinized food grade corn starch marketed under the trade designation 78–1215. The foregoing binders are all available commercially from National Starch and Chemical Corporation. The binder which is used in the preferred practice of the invention is, however, the pregelatinized starch marketed by Corn Products Company under the trade name "Amiiel."

The compressible mixtures of this invention are readily prepared. As indicated heretofore, the preparative method involves an initial step of forming a granulation of ascorbic acid and the binder material. In the production of the granulation, a mixture comprising from about 85% to about 95% by weight of ascorbic acid and from about 5% to about 15% by weight of the binder is first prepared. In the preferred embodiment of the invention, the mixture comprises from about 87% to about 92% by weight of ascorbic acid and from about 8% to about 13% by weight of the binder material. In the second step of the process, the ascorbic acid-binder mixture is granulated in a conventional manner. Water is used as the granulating agent and the quantity employed is variable. Generally, a satisfactory granulation will be obtained using a quantity of water which is equivalent to from about 10% to about 25% of the weight of the mixture. The granulation is obtained simply by mixing the liquid granulating agent with the ascorbic acid-binder mixture. The granulation, thus produced, is, thereafter, passed through a suitable mill or comminuting machine, following which the ground product is dried at an elevated temperature. After drying, the granulation can be, and preferably is, ground or comminuted once again. While the invention is not restricted thereto, the granulations which are produced in the preferred embodiment are comprised of particles, the size of which are distributed approximately as follows: about 0.5% retained on a 16 mesh screen; about 17% retained on a 20 mesh screen; about 37% retained on a 40 mesh screen; about 19% retained on a 60 mesh screen; about 9% retained on a 100 mesh screen; and about 17.5% passing through a 100 mesh screen. As used herein, the expressions 16, 20, 40, 60 and 100 mesh screens denote screens having 16, 20, 40, 60 and 100 openings, respectively, per linear inch.

The compositions described in the preceding paragraphs, after the addition of a lubricant thereto, are capable of being compressed into high potency ascorbic acid tablets having outstanding physical properties and characteristics. In general, any lubricant which is conventionally employed in producing pharmaceutical tablets can be used. As the lubricant there can be used a stearic acid salt, i.e., a metallic stearate, such as magnesium stearate, calcium stearate, etc. In the alternative, there can be used a wax-like material, for example, a saturated fatty acid, a mixture containing two or more saturated fatty acids or a hydrogenated glyceride, in admixture with a metallic stearate and/or titanium dioxide. Also suitable for use as the lubricant is a mixture of 25% by weight of a metallic stearate, such as, calcium stearate, and 75% by weight of corn starch. In the preferred embodiment of the invention, there is used, as the lubricating agent, a mixture comprising from about 20% to about 25% by weight of calcium stearate, from about 20% to about 25% by weight of silicon dioxide and from about 50% to about 60% by weight of corn starch. The quantity of lubricant employed is variable. Generally, however, the lubricant, or lubricant mixture, will comprise from about 1.0% to about 7.0% of the compressible mixture. The lubricant is merely added to, and mixed with, the granulation, following which the mixture is converted into tablets by conventional methods.

As indicated heretofore, the present invention is predicated, at least in part, on the use of ascorbic acid in the form of unground crystals having a particular particle size range. The use of powdered ascorbic acid or crystals which are coarser than those denoted herein does not provide a satisfactory product. The invention is noteworthy wherein it provides compositions which are compressible into tablets using conventional techniques and equipment. The tablets which are thus obtained are relatively small in size and light in weight, but at the same time they contain a high level of ascorbic acid. For example, in one of the preferred embodiments of the invention, tablets are produced weighing 560 mg. to 575 mg. which contain 500 mg. of ascorbic acid. This is in contrast to conventional 500 mg. ascorbic acid tablets of the prior art which normally weigh from about 720 mg. to 740 mg.

It is obvious from the foregoing that several benefits flow from the present invention. The tablets produced therein are of such size that the problem of consumer rejection is, for the most part, obviated. Furthermore, since they contain smaller quantities of inert materials, i.e., expedients and adjuvants, the tablets, prepared from the present compositions, are far more economical, i.e., less expensive to produce. Moreover, since tablets produced, from the compositions described herein, are lighter in weight and smaller in size than tablets of comparable potency produced by prior art methods, smaller, less expensive bottles are required in packaging, storage requirements are minimized and shipping costs are reduced.

For a fuller understanding of the nature and objects of this invention, reference may be had to the following examples which are given merely as further illustration of the invention and are not to be construed in a limiting sense. All parts given in the examples are parts by weight unless otherwise indicated.

EXAMPLE 1

In this example, 200 parts of ascorbic acid and 20 parts of Amijel (a pregelatinized corn starch marketed by Corn Products Company) were charged into a stainless steel mixer. The ascorbic acid used was in the form of unground crystals, 29% by weight of which were retained on a 200 mesh screen and 71% by weight of which passed through a 200 mesh screen. The mixture of ascorbic acid and Amijel was then granulated using about 25 parts of distilled water. The wet granulation was passed through a Fitzpatrick mill, equipped with a No. 5 screen operating at low speed, with knives forward. The milled granulation was thereafter driver overnight at a temperature of about 105 F. The dry granulation was then passed through a Fitzpatrick mill, equipped with a No. 12 screen operating at medium speed, with knives forward.

The granulation, produced as described in the preceding paragraph, was admixed with a mixture comprising 2 parts of calcium stearate and 6 parts of corn starch. Thereafter, the mixture was compressed at a tablet weight of 570 mg. using a 15/32" flat-faced, beveled edged, scored punch.

There was, thus obtained, tablets weighing 570 mg. containing 500 mg. of ascorbic acid. The tablets had completely acceptable color, hardness and disintegrating characteristics.

EXAMPLE 2

(a) In this example, 500 parts of ascorbic acid, in the form of unground crystals, 29% by weight of which were retained on a 200 mesh screen and 71% by weight of which passed through a 200 mesh screen, were admixed with 25 parts of Amijel. This mixture was granulated with distilled water in the manner described in Example 1, following which 5 parts of calcium stearate, 15 parts of corn starch and 5 parts of silicon dioxide were added thereto. The granulation was then compressed, as described in Example 1, at a tablet weight of 550 mg. to provide tablets containing 500 mg. of ascorbic acid.

The tablets, thus obtained, were found to possess outstanding color, hardness and disintegration characteristics.

(b) The procedure described in section (a) of this example was repeated using, however, 500 parts of the ascorbic acid and 50 parts of Amijel. The ascorbic acid used was the same type as was used in section (a) of this example. The granulation was compressed at a tablet weight of 575 mg. to provide tablets containing 500 mg. of ascorbic acid. The tablets, thus obtained, were found to have outstanding color, hardness and disintegration characteristics.

(c) The procedure described in section (a) of this example was repeated once again using, however, 500 parts of the ascorbic acid and 75 parts of Amijel. The ascorbic acid used was of the same type used in section (a). The granulation was compressed at a tablet weight of 600 mg. The tablets, thus obtained, contained 500 mg. of ascorbic acid and they had outstanding color, hardness and disintegration characteristics.

EXAMPLE 3

By the procedure described in Example 2, granulations were prepared using the following named ingredients in the quantities hereinafter indicated:

| Gran. No. | Ascorbic acid (parts by weight) | Binder (parts by weight) | Calcium stearate (parts by weight) | Silicon dioxide (parts by weight) | Corn starch (parts by weight) |
| --- | --- | --- | --- | --- | --- |
| 1 | 500 | 25 | 5 | 5 | 15 |
| 2 | 500 | 50 | 5 | 5 | 15 |
| 3 | 500 | 75 | 5 | 5 | 15 |
| 4 | 500 | 25 | 5 | 5 | 15 |
| 5 | 500 | 50 | 5 | 5 | 15 |
| 6 | 500 | 75 | 5 | 5 | 15 |

The ascorbic acid used in each instance was in the form of unground crystals, the crystals being of a particle size such that 29% by weight thereof were retained on a 200 mesh screen and 71% by weight thereof passed through a 200 mesh screen, In the case of granulation Nos. 1, 2 and 3, the binder employed was the cold water gelling pregelatinized food grade starch marketed under the designation National Starch 78-1215. In the case of granulation Nos. 4, 5 and 6, the binder used was the low viscosity tapioca dextrin marketed under the trade name Crystal Gum.

Granulation Nos. 1 and 4 were compressed at a tablet weight of 550 mg.; Nos. 2 and 5 at 575 mg.; and Nos. 3 and 6 at 600 mg.

In each instance, there was obtained tablets containing 500 mg. of ascorbic acid, having outstanding color, hardness and disintegrating characteristics.

EXAMPLE 4

Granulations were prepared by the method described in Example 2, using the following named ingredients in the quantities hereinafter indicated:

| Gran. No. | Ascorbic acid (parts by weight) | Binder (parts by weight) | Calcium stearate (parts by weight) | Silicon dioxide (parts by weight) | Corn starch (parts by weight) |
|---|---|---|---|---|---|
| 7 | 500 | 25 | 5 | 5 | 15 |
| 8 | 500 | 50 | 5 | 5 | 15 |
| 9 | 500 | 75 | 5 | 5 | 15 |
| 10 | 500 | 25 | 5 | 5 | 15 |
| 11 | 500 | 50 | 5 | 5 | 15 |
| 12 | 500 | 75 | 5 | 5 | 15 |

The ascorbic acid used in each instance was in the form of unground crystals, 29% by weight of the particles of which were retained on a 200 mesh screen and 71% by weight of the particles of which passed through a 200 mesh screen. In the case of granulation Nos. 7, 8 and 9, the binder employed was the pregelatinized modified and stabilized waxy maize starch which is marketed under the trade name Instant Clearjel. In the case of granulation Nos. 10, 11 and 12, the binder employed was the pregelatinized food starch refined from tapioca which is marketed under the trade name Instant Jel.

Granulation Nos. 7 and 10 were compressed at a tablet weight of 550 mg.; Nos. 8 and 11 at a tablet weight of 575 mg.; and Nos. 9 and 12 at a tablet weight of 600 mg.

In each instance, there was obtained tablets having outstanding color, hardness and disintegration characteristics, each containing 500 mg. of ascorbic acid.

Example 5

Granulations were prepared by the method described in Example 2 using the following named ingredients in the quantities hereinafter indicated:

| Gran. No. | Ascorbic acid (parts by weight) | Binder (parts by weight) | Calcium stearate (parts by weight) | Silicon dioxide (parts by weight) | Corn starch (parts by weight) |
|---|---|---|---|---|---|
| 13 | 500 | 25 | 5 | 5 | 15 |
| 14 | 500 | 50 | 5 | 5 | 15 |
| 15 | 500 | 75 | 5 | 5 | 15 |
| 16 | 500 | 25 | 5 | 5 | 15 |
| 17 | 500 | 50 | 5 | 5 | 15 |
| 18 | 500 | 75 | 5 | 5 | 15 |

The ascorbic acid used in each instance was comprised of unground crystals made up of particles 29% by weight of which were retained on a 200 mesh screen and 71% by weight of which passed through a 200 mesh screen. In the case of granulation Nos. 13, 14 and 15, the binder employed was the stable modified amylopectin which is marketed under the trade name Kosol. In the case of granulation Nos. 16, 17 and 18, the binder employed was the pregelatinized starch marketed by A. E. Staley Manufacturing Company, Decatur, Ill. under the trade name STA-RX 700.

Granulation Nos. 13 and 16 were compressed at a tablet weight of 550 mg.; Nos. 14 and 17 at a tablet weight of 575 mg.; and Nos. 15 and 19 at a tablet weight of 600 mg.

In each instance, there was obtained tablets having outstanding color, hardness and disintegration characteristics, each containing 500 mg. of ascorbic acid.

I claim:

1. A compressed tablet granulation consisting essentially of (1) from not less than about 85% to about 95% by weight of ascorbic acid and (2) from not more than about 5% to about 15% by weight of a binder selected from the group consisting of a pregelatinized, modified and stabilized waxy maize starch, pregelatinized corn starch, pregelatinized tapioca starch, stable modified amylopectin, low viscosity tapioca dextrin, dextrinized corn starch, cold water gelling pregelatinized corn starch and a mixture thereof, said ascorbic acid being in the form of unground crystals, 18% to 40% by weight of which are retained on a 200 mesh screen and 60% to 82% by weight of which pass through a 200 mesh screen and said binder being at least partially soluble in water.

2. The compressed tablet granulation of claim 1 wherein there is present also from about 1.0% to about 7.0% of a lubricant.

3. The compressed tablet granulation of claim 2 wherein the lubricant is a mixture comprising calcium stearate and corn starch.

4. The compressed tablet granulation of claim 2 wherein the lubricant is a mixture comprising from about 20% to about 25% by weight of calcium stearate, from about 20% to about 25% by weight of silicon dioxide and from about 50% to about 60% by weight of corn starch.

References Cited

UNITED STATES PATENTS

| 2,876,160 | 3/1959 | Schoch et al. | 167—82 |
| 2,887,436 | 5/1959 | Klioze et al. | 167—81 |
| 2,887,437 | 5/1959 | Klioze et al. | 167—81 |
| 3,034,911 | 5/1962 | McKee et al. | 167—82 XR |
| 3,079,303 | 2/1963 | Raff et al. | 167—82 |
| 3,175,948 | 3/1965 | Koff et al. | 167—81 |
| 3,181,998 | 5/1965 | Kanig | 167—82 |
| 3,293,132 | 12/1966 | Stoyle et al. | 167—82 |

LEWIS GOTTS, Primary Examiner.

S. K. ROSE, Assistant Examiner.

U.S. Cl. X.R.

424—361